W. B. MURRAY.
TRAIN CONTROLLING SYSTEM.
APPLICATION FILED MAY 6, 1918.

1,380,578.

Patented June 7, 1921.
7 SHEETS—SHEET 1.

Fig. 1.

Witness
J. M. Syfud

Inventor
William B. Murray,
By C. L. Parkin
Attorney

W. B. MURRAY.
TRAIN CONTROLLING SYSTEM.
APPLICATION FILED MAY 6, 1918.

1,380,578.

Patented June 7, 1921.
7 SHEETS—SHEET 6.

Inventor
William B. Murray,

Witness
By C. L. Parker Attorney

W. B. MURRAY.
TRAIN CONTROLLING SYSTEM.
APPLICATION FILED MAY 6, 1918.

1,380,578.

Patented June 7, 1921.
7 SHEETS—SHEET 7.

Inventor
William B. Murray,

UNITED STATES PATENT OFFICE.

WILLIAM B. MURRAY, OF DANVILLE, ILLINOIS, ASSIGNOR TO THE MILLER TRAIN CONTROL CORPORATION, OF STAUNTON, VIRGINIA, A CORPORATION OF VIRGINIA.

TRAIN-CONTROLLING SYSTEM.

1,380,578.  Specification of Letters Patent.  Patented June 7, 1921.

Application filed May 6, 1918. Serial No. 232,906.

*To all whom it may concern:*

Be it known that I, WILLIAM B. MURRAY, a citizen of the United States, residing at Danville, in the county of Vermilion and State of Illinois, have invented certain new and useful Improvements in Train-Controlling Systems, of which the following is a specification.

My invention relates to train controlling or stopping means adapted for use in connection with a railway locomotive, electric car or the like, while not necessarily restricted to this use.

An important object of the invention is to provide means whereby the engine or power driven vehicle cannot be operated above a selected speed, upon the same passing a de-energized ramp, until the apparatus has again been actuated by an energized ramp, or the vehicle brought to a stop.

Other objects and advantages of the invention will be apparent during the course of the following description.

In the accompanying drawings forming a part of this specification and in which like numerals are employed to designate like parts throughout the same, Fig. 19 is a side elevation of an engineer's air brake valve and operating means therefor, Fig. 20 is a plan view of the same, Fig. 21 is a perspective view of a coin controlling means, and, Fig. 22 is a partly diagrammatic view of the shoe and circuit therefor.

In the drawings, wherein for the purpose of illustration is shown a preferred embodiment of my invention, the numeral 25 designates a railway locomotive of any well known or preferred type. This locomotive has the usual cab 26, within which is arranged the engineer's air brake valve 27 (see Figs. 19 and 20), including a lever 28. Secured to this lever is a grooved pulley 29, to turn the same, and a cable 30 is wound about the pulley 29 and secured thereto. The cable is connected with one arm of a bell-crank lever 31, pivoted at 32. The opposite arm of the bell-crank lever 31 has pivotal connection with a piston rod 33, as shown at 34.

Figures 2, 3:
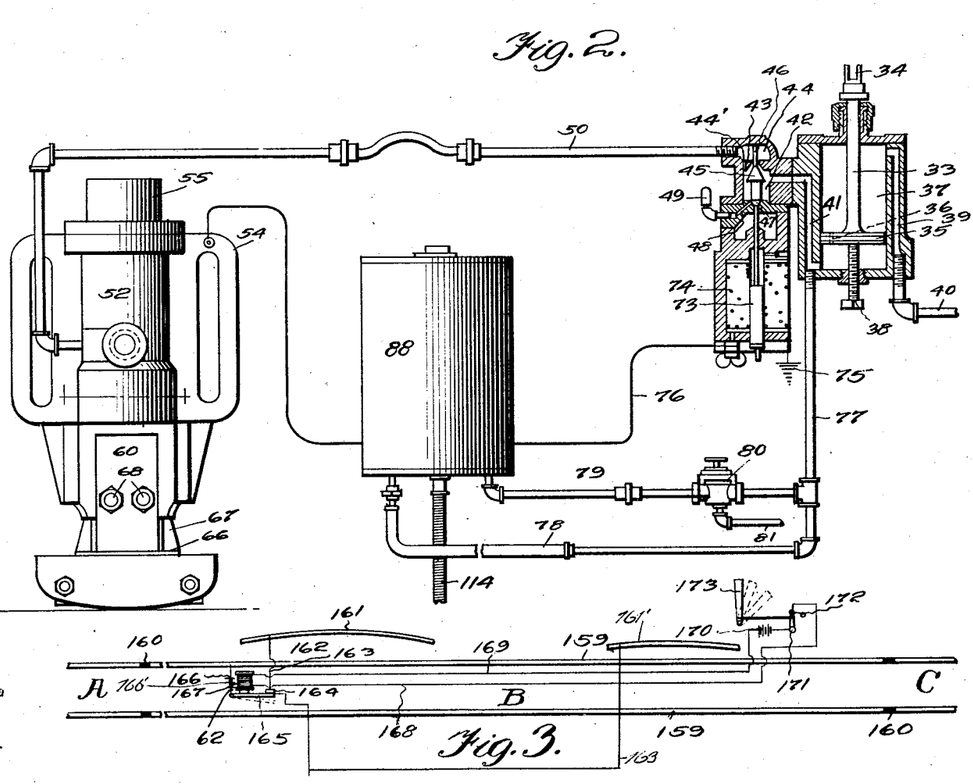
Fig. 2 is a similar view, removed from the locomotive, with parts in section.
Fig. 3 is a diagrammatic view of a track circuit.
Figures 4, 5:
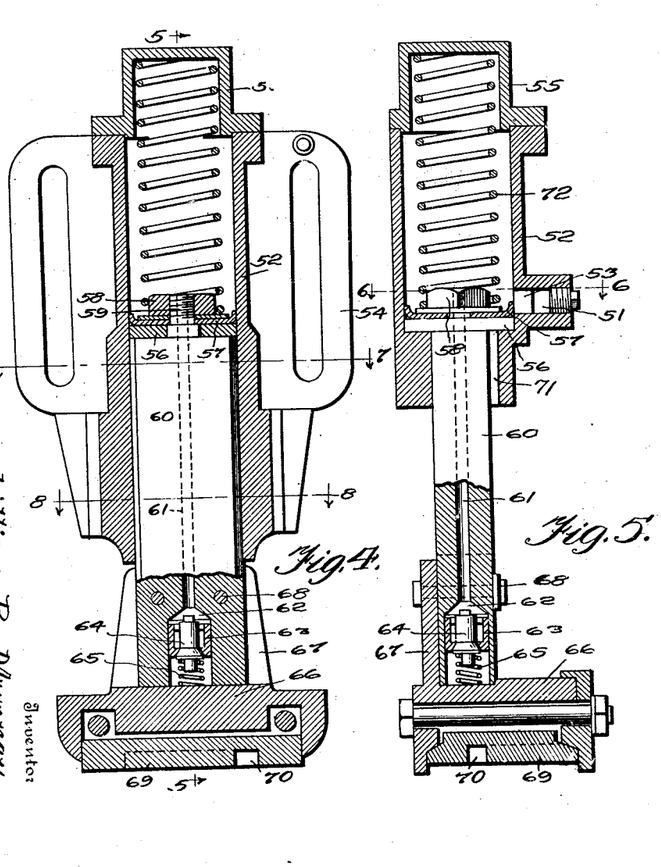
Fig. 4 is a central vertical sectional view through a mechanically actuated shoe, included in the apparatus.
Fig. 5 is a section taken on line 5—5 of Fig. 4.
Figure 6:
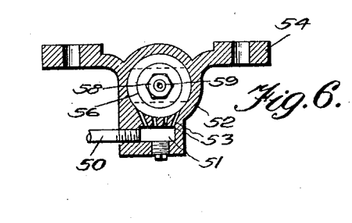
Fig. 6 is a horizontal sectional view taken on line 6—6 of Fig. 5.
Figure 7:
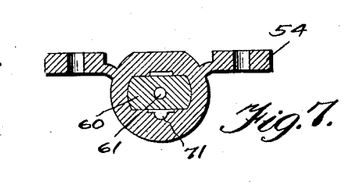
Fig. 7 is a similar view taken on line 7—7 of Fig. 4.
Figure 8:
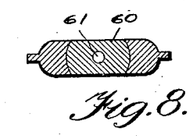
Fig. 8 is a similar view taken on line 8—8 of Fig. 4.
Figure 9:
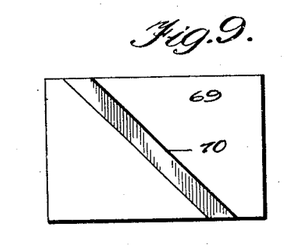
Fig. 9 is a bottom plan view of a contact plate.

As more clearly shown in Fig. 2, the piston rod 33 is connected with a piston 35, having a contracted port 36 formed therein, and passing through the opposite faces thereof. The piston 35 operates within a vertically arranged cylinder 37, disposed within the cab 26, as shown. The piston is adapted to have its downward movement limited by a stop 38. The cylinder 37 is provided upon one side of its wall with an inlet port 39, discharging into the upper end of the cylinder above the piston 35. A pipe 40 leads into the lower end of the port 39 and this pipe has means of communication with a source of compressed air. The opposite side of the wall of the cylinder 37 is provided with a port 41, leading into the lower end of the cylinder, beneath the piston 35. The port 41 discharges into a chamber 42. This chamber is provided with an outlet opening 43, discharging into a coupling 44. The opening 43 is adapted to be covered by the upward movement of a valve 45 secured to a rod 46. The valve also includes a lower end 47, adapted, upon its downward movement, to cover a port 48, for supplying compressed air to a whistle 49 or like signal. There is a contracted port 44', between the chambers 42 and 44, but this port is of smaller diameter than the port 36, and fluid under pressure cannot pass therethrough at a sufficient rate to permit the piston 35 to descend.

Connected with the chamber 44 is a pipe 50, (see Fig. 2), leading into a chamber 51, having communication with a cylinder 52, through ports 53. The cylinder 52 is rigidly secured to a support-plate 54, which is bolted or otherwise rigidly attached to the truck of the tender of the locomotive and is insulated therefrom by any suitable means. The upper end of the cylinder 52 is closed by a cap 55, bolted or otherwise rigidly attached thereto. Mounted to reciprocate within the cylinder 52 is a piston 56, having packing 57, secured thereto by a nut 58, engaging a screw-threaded extension 59, of the reciprocatory bar 60. The bar 60 is provided with a longitudinal port 61, also passing through the extension 59. The port 61 leads into a chamber 62, having therein a tubular valve seat 63, engaged by a valve 64, held to its seat by a spring 65. The spring 65 has engagement with a shoe 66, carrying an attaching plate 67, bolted or otherwise rigidly attached to the bar 60, as shown at 68. It is thus apparent that should the shoe 66 become disconnected or loosened from the bar 60, the valve 64 will move away from its seat, thus allowing the pressure within the port 61 to exhaust to the atmosphere. The shoe 66 carries a hard steel contact block 69, rigidly and detachably secured thereto, by suitable means. This block is provided upon its lower contacting face with a diagonal groove 70, as shown. The lower end of the cylinder 52 is provided with a vertical groove 71, having its lower end leading to the atmosphere and its upper end in commuication with the lower end of the bore of the cylinder, beneath the piston 56. This piston is retained in the lower position by a spring 72. It is thus apparent that when the piston is in the lowermost position it serves to break communication between the chamber 51 and the groove 71, but when this piston is moved upwardly, communication is established between the two, and pressure will exhaust to the atmosphere through the groove 71.

The valve rod 46 is connected with the vertically movable core 73 of a solenoid 74. This solenoid winding 74 has one end thereof grounded to the frame-work of the engine, as shown at 75, while the opposite end of its winding is connected with a wire 76, which is connected with the plate 54. When the solenoid winding 74 is energized, the valve 45 closes the opening 43, and valve 47 uncovers the port 48, thereby allowing the signal 49 to function.

Leading into the lower end of the port 41 is a pipe 77, having a flexible hose 78 connected therewith. Connected with the pipe 77 is a pipe 79, having a regulator valve 80 connected therein, having connection with a pipe 81, which leads to the train line. The function of this regulator valve is to provide means for preventing more than a predetermined reduction of the pressure in the train line, by the action of the centrifugally controlled means, to be described, it being understood that the valve 80 closes the pipe 79 when the pressure within the train line has been reduced to a certain degree.

Figure 13:
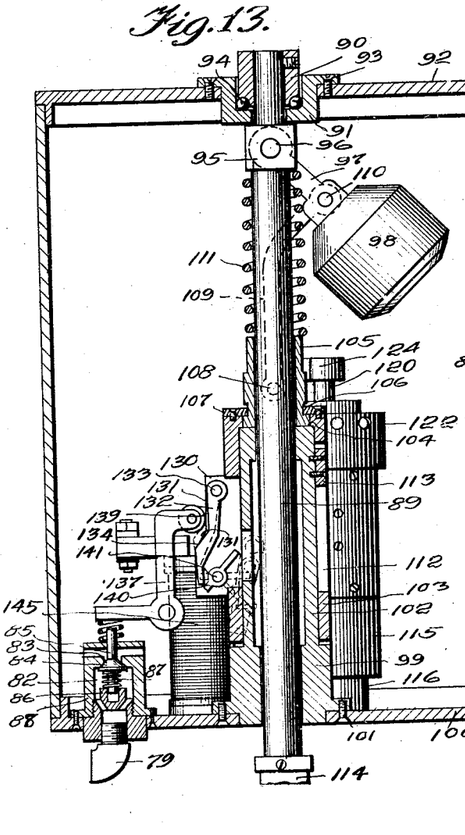
Fig. 13 is a longitudinal sectional view taken on line 13—13 of Fig. 12.

As more clearly shown in Fig. 13, the pipe 79 leads into a valve casing or chamber 82, having an outlet opening or valve seat 83 formed in its upper end, having communication with the atmosphere. The opening 83 is normally covered by a valve 84, carried by a vertically reciprocatory valve stem 85, extending above the casing 82. The lower end of the valve stem 85 operates within a spider 86, and a compressible coil spring 87 is disposed between the spider and the valve 84. It is thus apparent that when the valve 84 is unseated pressure will discharge from the lower end of the cylinder 37 to the atmosphere.

The valve casing 82 is arranged within a housing or casing 88, and a vertical shaft 89 of a centrifugal governor is disposed therein. This shaft is free to rotate but cannot partake of longitudinal movement. The shaft 89 has a ring or annular bearing 90 rigidly secured to its upper end, with a coacting annular bearing 91, attached to the top 92 of the housing by means of screws 93 or the like. Bearing balls 94 are arranged between the bearings 90 and 91, as shown. Rigidly secured to the upper portion of the shaft 89, beneath the bearing 91, is a sleeve 95, having its opposite sides flattened. This sleeve is provided upon its flattened sides with trunnions 96, pivotally receiving arms 97 of a centrifugal governor. These arms carry balls or weights 98, as shown. The shaft 89 extends through a stationary tubular guide 99, rigidly secured to the bottom 100 of the housing, as shown at 101. The tubular guide 99 has an upper reduced portion 102, slidably receiving a vertically movable tubular support 103. The tubular support 103 has its upper end provided with a circular opening 104, pivotally receiving the lower end of a swiveled tubular connection or sleeve 105. This sleeve is provided with an annular groove 106, receiving a two-part ring 107, rigidly attached to the upper end of the tubular support 103. It is thus apparent that the sleeve 105 is swiveled to the support 103. Pivotally connected with the sleeve 105, as shown at 108, are arms 109, having pivotal connection with the arms 97, as shown at 110. The upward movement of the sleeve 105 is opposed by a compressible coil spring 111, engaging the sleeve 95 and the sleeve 105. The tubular support 103 is provided upon one side with a longitudinal slot 112, within which is disposed a lug 113, rigidly attached to the guide 102. It is thus apparent that means are provided to prevent the rotation of the tubular support 103. From the foregoing description it is obvious that as the centrifugal governor is set into rotation, the same will elevate the tubular support 103.

Figure 1:
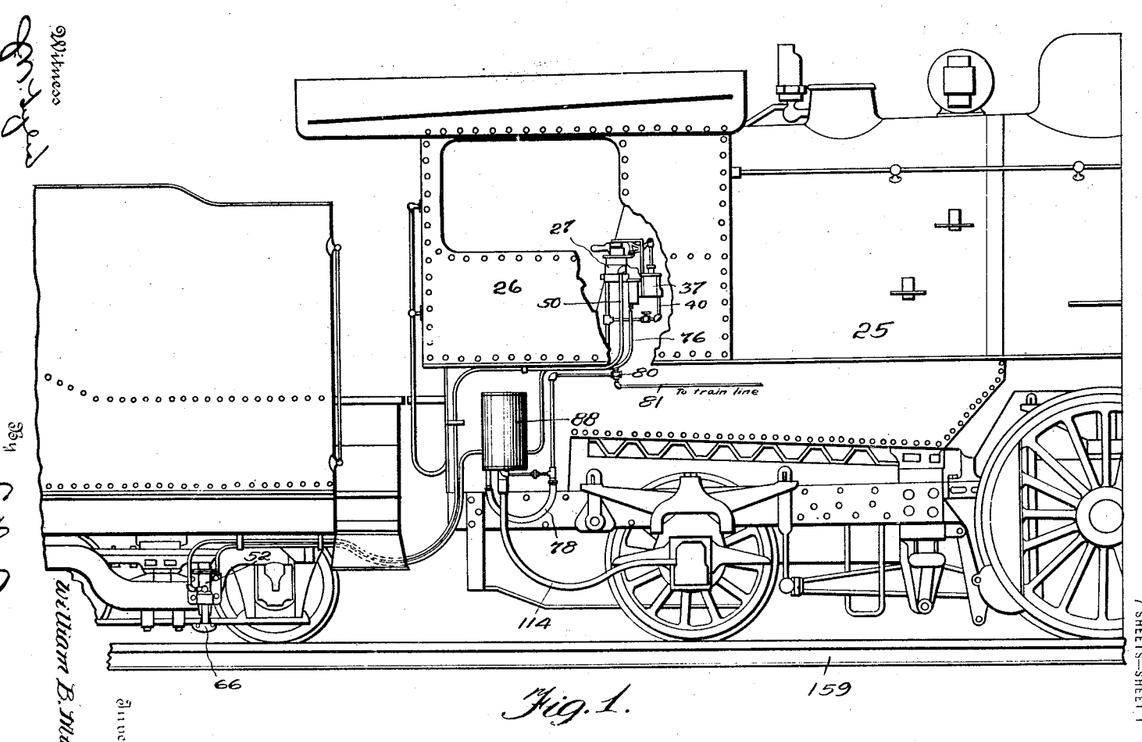
Figure 1 is a side elevation of apparatus embodying my invention, showing the same applied to a railway locomotive.
Figure 10:
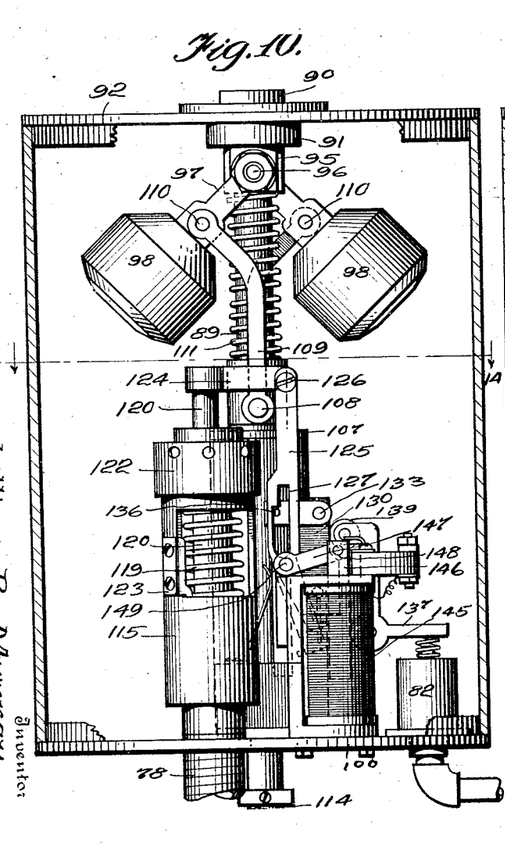
Fig. 10 is a side elevation of centrifugally actuated train stopping mechanism.
Figure 11:
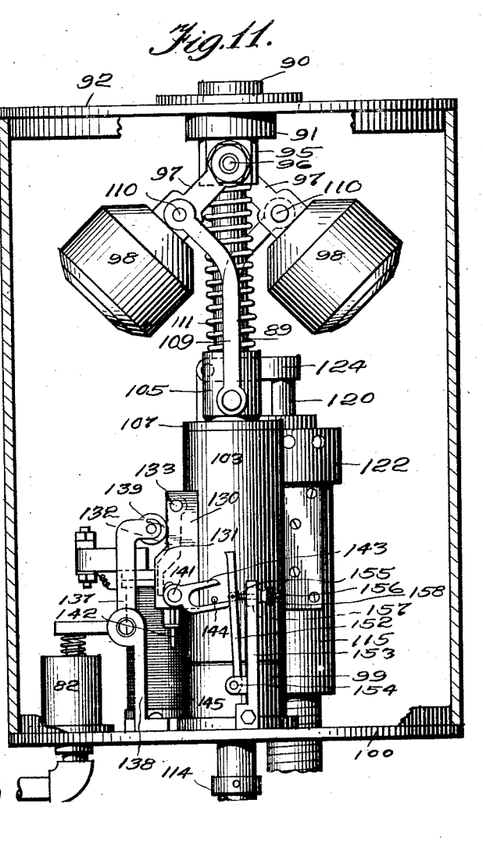
Fig. 11 is a similar view of the opposite side of the apparatus.
Figure 12:
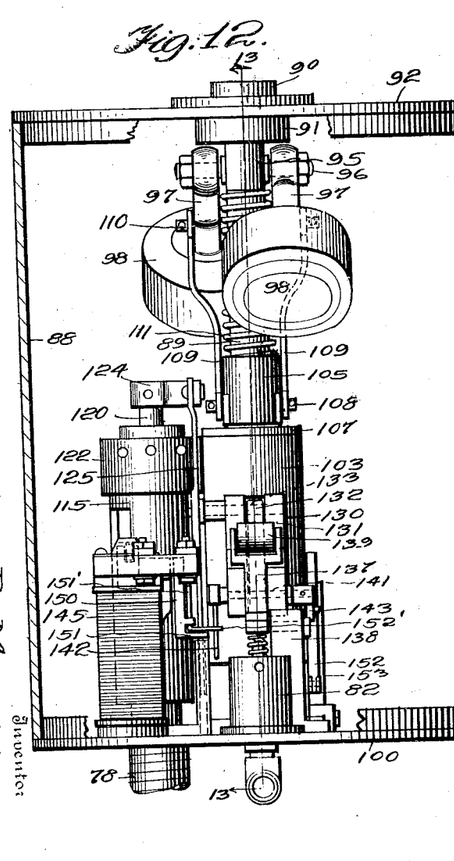
Fig. 12 is an elevation of one side of the apparatus taken at a right angle to the showing in Fig. 10.
Figure 15:
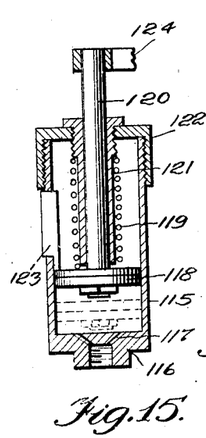
Fig. 15 is a detail section through a vertically movable cylinder and associated elements.

The shaft 89 of the centrifugal governor is preferably driven by a flexible shaft 114, suitably geared to an axle of a locomotive, as indicated in Fig. 1, while any other suitable driving means between this shaft and the axle of the locomotive may be employed. Rigidly connected with the tubular support 103 for movement therewith is a vertically movable cylinder 115, (see Figs. 10, 11 and 15) extending parallel with the tubular support. This cylinder, as more clearly indicated in Fig. 15, has its lower end provided with a tubular extension 116 adapted to receive the flexible hose 78. The tubular extension leads into ports 117, discharging into the lower end of the cylinder 115, beneath a piston 118 therein. The pressure within the cylinder 115 normally retains the piston 118 elevated, in opposition to a compressible coil spring 119, surrounding a vertically movable piston rod 120, rigidly attached to the piston 118. The piston rod 120 operates within a guide sleeve 121, the upper end of which has screw-threaded engagement within an opening formed in a cap 122, having screw-threaded engagement with the upper end of the cylinder 115. By adjusting or turning the cap 122 the tension of the spring 119 may be regulated. The piston 118 has its upward movement restricted by a stop 123, secured to the cylinder 115, and arranged in an opening formed therein. As more clearly shown in Figs. 10, 12, and 18, the rod 120 has a horizontal arm 124 rigidly secured thereto. This arm has pivotal connection with a depending arm 125, as shown at 126. The arm 125 is provided with a vertically arranged slot 127 having an enlarged lower portion 128, provided with a shoulder 129.

Figure 14:
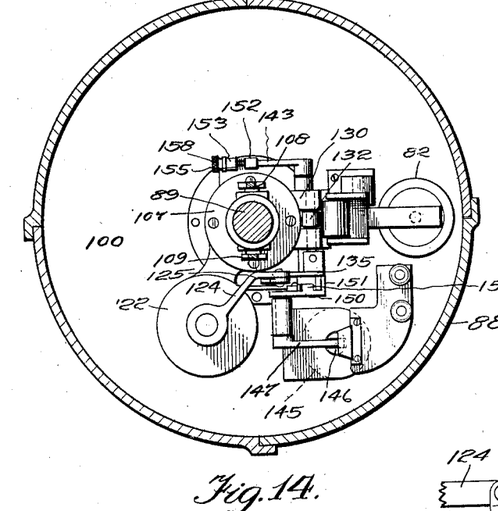
Fig. 14 is a horizontal sectional view taken on line 14—14 of Fig. 10.

Preferably formed integral with one side of the tubular support 103 are ribs 130, (see Figs. 12, 14 and 18), having fixed cam faces 131, formed upon their lower portions. Arranged between the pair of ribs 130 is a swinging cam element 132 (see Fig. 21) pivoted to the ribs at its upper end, as shown at 133. The cam element 132 has a cam face 134, which is adjustable, and when the cam element 132 is swung downwardly, this cam face will be positioned above the cam faces 131. The cam element 132 is rigidly secured to a rock-shaft 133, journaled in openings in the ribs 130, and a crank 135 is rigidly secured to one end of the shaft 133, as clearly indicated in Fig. 18. This crank carries a lateral extension or pin 136, adapted for engagement beneath the shoulder 129. It might be stated at this point, that when the arm 125 descends, with the pin 136 beneath the shoulder 129, the crank 135 will be swung downwardly, and the cam element 132 shifted to the outer active position.

The numeral 137 designates a bell-crank lever (Fig. 13) pivoted to a stationary support at 138. The horizontal arm of this bell-crank lever contacts with the valve stem 85 while its vertical arm is preferably forked and has pivotal connection with a roller 139 adapted to contact with the two sets of cam faces 131 and 134. When the lever 137 is swung upon its pivot, it serves to open the valve 84.

Figures 17, 18:
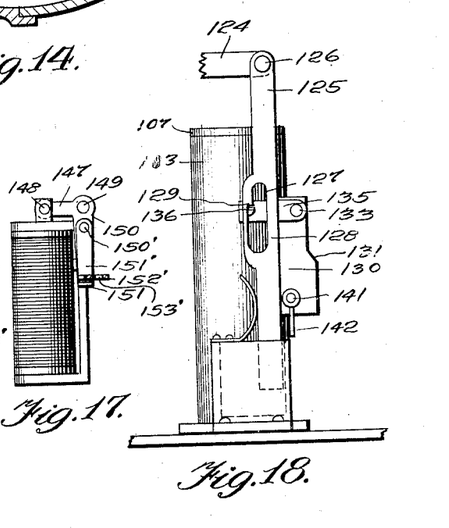
Fig. 17 is a similar view of the same taken at a right angle thereto.
Fig. 18 is a side elevation of an operating arm and associated elements.
Figures 19, 20, 21, 22:
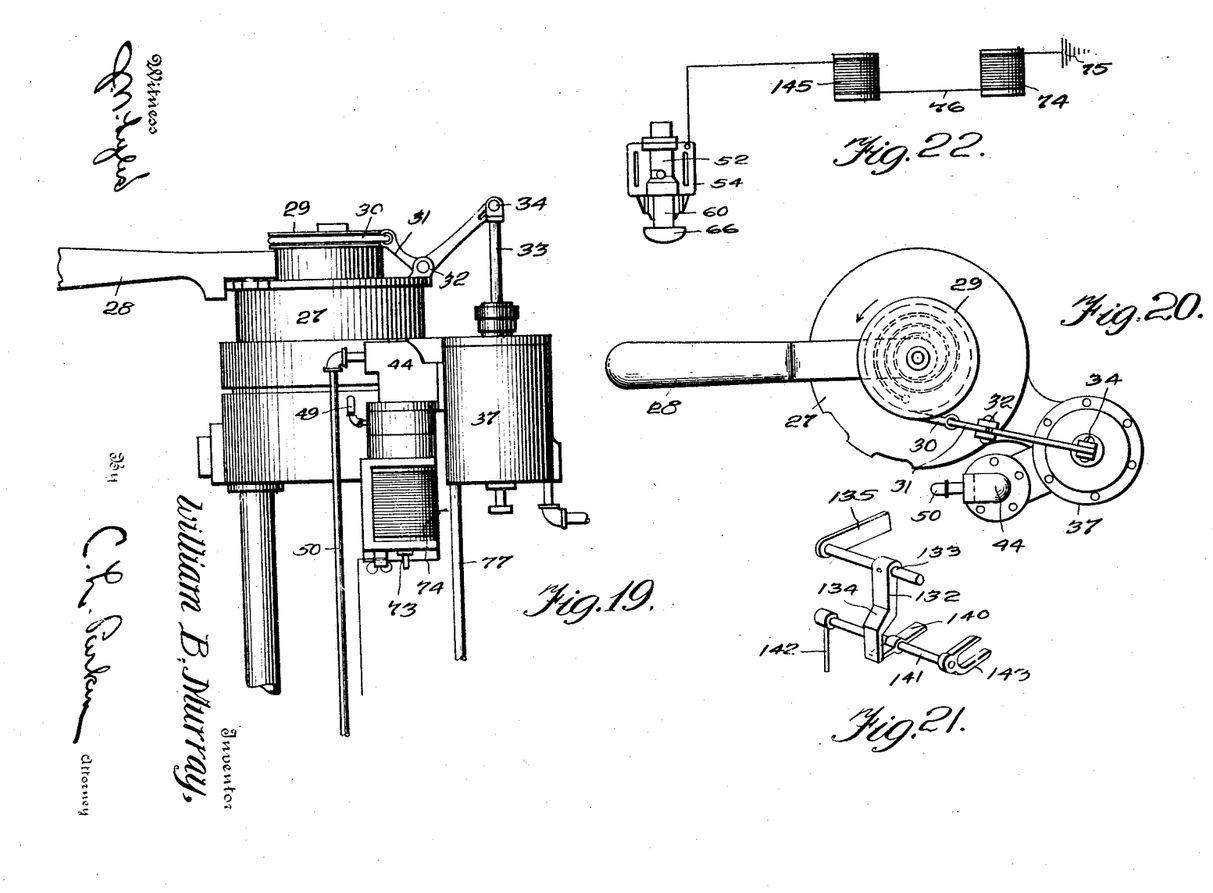

As clearly shown in Figs. 13 and 21, a gravity operated latch 140 is positioned behind the cam element 132, and rigidly secured to a rock-shaft 141. This latch is adapted to have its short end arranged behind the cam element 132, when the cam element is shifted to the outer position, thereby locking the cam element against inward movement until the latch element 140 is swung to the inactive position. The rock-shaft 141 which carries the latch element 140 is journaled through the lower ends of the ribs 130, as more clearly shown in Fig. 18, is provided at one end with a depending crank or pin 142, and upon its opposite end with a forked crank 143, rigidly secured thereto. A stop pin 144 (Fig. 11) is arranged between the portions of the forked crank 143 and serve to limit the upward movement of the crank. This stop 144 is carried by the member 103.

Figure 16:
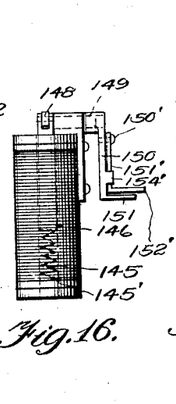
Fig. 16 is a side elevation of a control solenoid.

Electrically operated means are provided to shift the shaft 141, to the inactive position, comprising a solenoid winding 145, connected in series with the wire 76, as clearly shown in Fig. 22. This solenoid winding receives a vertically movable core 146, normally retained in the upper position by means of a spring 145'. When the solenoid is energized the core 146 is moved downwardly and swings a crank 147 downwardly, which crank is pivoted thereto, as shown at 148. The crank 147 is rigidly secured to a rock-shaft 149 (see Fig. 16) having a depending crank 150 rigidly secured thereto. This depending crank is provided upon its lower end with a lateral extension 151, arranged to contact with the lower portion of the arm 125. Pivoted to the crank 150, as shown at 150', is an arm 151', having a lateral extension 152', apertured at 153', for the reception of the pin or crank 142. The crank 150 is provided upon its rear edge (Fig. 16) with a shoulder 154', to contact with the crank 151', so that it swings with the crank 150. It is thus apparent that when the solenoid winding 145 is energized the arm 125 is shifted to the left, in Fig. 10, whereby the shoulder 129 is brought from above the pin 136, and the rock-shaft 141 is simultaneously turned to shift the latch element 140 to the inactive position, as indicated in Fig. 13 and the engine brought to a stop as more fully described hereinafter.

When the engine comes to a stop, and the tubular support 103 is moved to the lowermost position, the crank 143 will engage a stationary trip 152, pivoted to a stationary support 153, as shown at 154. The lateral movement of the trip is opposed by a spring 155, surrounding a bolt 156, pivoted to the trip 152, as clearly shown in Fig. 11. This bolt operates within an opening 157 formed in the support 153 and is screw-threaded for the reception of a nut 158. The crank 143 is shifted upwardly and turns the rock shaft 141 and shifts the latch 140 to the upper inclined position. It is thus apparent that the latch element 140 will be returned to the inactive position when the solenoid winding 145 is energized or when the tubular support 103 descends to the lowermost position, upon the stopping of the engine.

In Fig. 3, I have shown a track comprising track rails 159, insulated at spaced intervals 160 for providing blocks A, B, and C. The entrance end of each block is guarded by a ramp or ramps 161 and 161' which are longitudinally curved in a vertical plane and descend toward the ends. These ramps have electrical connection with wires 163, the opposite ends of which are connected with a stationary contact 164. This stationary contact is adapted to be engaged and disengaged by a swinging contact element 165, forming the armature of a relay. The swinging contact has connection with a wire 166, connected to the rail 159. A source of current 166' is connected in the wire 166. The relay includes an electro-magnet 167 arranged near the swinging contact 165 and this electro-magnet is connected with wires 168 and 169. The wire 169 is connected with one pole of a source of current 170, and the opposite pole of the source of current is connected with a swinging contact 171, adapted to be moved into and out of engagement with a stationary contact 172, connected with the wire 168. The contact 171 is suitably connected with a semaphore paddle 173, to be shifted upon the movement of the same. Thus, when the semaphore paddle 173 is moved to the lower danger position, the contact 171 disengages the contact 172, whereby the electro-magnet 167 is deënergized and the ramp circuit broken.

The operation of the system is as follows:

For the purpose of illustration, it will be assumed that the ramps 161 and 161', (Fig. 3) which guard the entrance end of block C have connection with its source of current 166'. The semaphore paddle 173 is in the upper position, indicating that the block C is clear. The circuit including the electromagnet 167 is therefore closed, holding contact 165 in engagement with contact 164.

When the engine 25 traveling in block B approaches the ramp 161, the shoe 66 contacts with the ramp and is thereby elevated. The upward movement of the shoe moves the bar 60 upwardly whereby the piston valve 56 is elevated to place port 71 in communication with chamber 51. Pressure from beneath the piston 35 in cylinder 37 is now exhausted to the atmosphere through port 41, pipe 50, chamber 51, and port 71. More or less simultaneously with the upward movement of the shoe, a circuit is closed which energizes the solenoid winding 74 whereby the valve 45 is seated and pressure cannot exhaust to the atmosphere, to cause the downward movement of the piston 35. In this closed circuit, current flows from one pole of the source of current 166', through the rail 159, frame-work of the engine, the ground 75, solenoid winding 74, wire 76, plate 54, contact shoe 66, ramp 161, through wire 163, contact 164, armature 165, and back to the opposite pole of the source of current. It is thus apparent that the engine will pass the ramp without the train stopping means being actuated.

If the semaphore paddle 173 were in the inclined position, indicating that the block C is in danger or caution condition, the ramp 161 would be disconnected from its source of current, at the contacts 164 and 165, thereby causing the ramp to be deënergized. When the shoe 166 travels over the ramp 161 as above indicated, it would be elevated and pressure exhausted from the lower side of the piston 35, within the cylinder 37 but the valve 45 would not be seated, and the piston 35 would thereby descend actuating the engineer's air brake 27 and applying the brakes to stop the train.

The centrifugal governor, including the shaft 89 is rotated by the flexible shaft 114, and when the speed of the engine exceeds a predetermined limit, such as 70 miles an hour, the engine will be stopped irrespective of the presence or absence of the ramp operation. When the rotation of the shaft 89 exceeds a predetermined point, the support 103 is elevated sufficiently to bring the main cam surface 131 in contact with the roller 139, which swings the bell-crank lever 137 upon its pivot. This downward movement of the bell-crank lever depresses the valve stem 85 and unseats the valve 84. The pipe 79 being thereby placed into communication with the atmosphere, pressure is reduced beneath the piston 35, and the piston descends thereby applying the brakes.

When the engine travels over a ramp 161 which is energized, pressure is not exhausted from beneath the piston 35 as above stated and the piston 118 (see Fig. 15) remains in the upper position, and is held therein by the fluid pressure beneath the same. When the fluid pressure is exhausted from beneath the piston 35, as above stated, it is obvious that the same is also exhausted from the lower end of the cylinder 115, beneath the piston 118 and the spring 119 will thereby cause the piston to descend. This downward movement of the piston 118 moves the rod 120 downwardly carrying with it the arm 124. As clearly shown in Fig. 18, the downward movement of the arm 124 moves the lever 125 downwardly and the extension 136 being now arranged beneath the shoulder 129, the crank 135 will be swung downwardly. The downward movement of the crank 135 turns the rock-shaft 133 in the proper direction to swing the supplemental cam element 134 outwardly to assume a position above and in advance of the main cam face 131. This supplemental cam is now set to swing the bell-crank lever 137 to open the valve 84 when the speed of the centrifugal governor exceeds 30 miles per hour or any other selected speed beneath the maximum speed. It will be understood that by changing the relative positions of the crank 135 and the supplemental cam element, the maximum number of miles per hour traveled by the engine at low speed may be changed. It is thus apparent that should the engineer release the brakes, after the engine has passed the de-energized ramp 161, he cannot proceed at a speed in excess of that defined by the supplemental cam element 134, to wit, 30 miles an hour, until the supplemental cam element has been restored to its normal position. When the supplemental cam element 132 is swung outwardly, as above stated, the latch 140 gravitates to the horizontal position, indicated in Fig. 13, thereby holding or locking the cam element in the outer active position. This cam element remains in active position until the shoe 66 engages a second ramp which is energized, but is not released if the ramp is not energized. When the shoe engages the next energized ramp the circuit is again closed for energizing the solenoid winding 74, and as the electro-magnet 145 is connected in series therewith (Fig. 22) such electro-magnet is simultaneously energized. When the electro-magnet is simultaneously energized, the rock-shaft 149 is turned and the depending crank 150 swung in the direction to swing the lever 125 so that the shoulder 129 (Fig. 18) is moved out of alinement with the extension 136. It is thus apparent that should the piston 118 now descend, it could not actuate the crank 135. Simultaneously with this action, the crank 150 swings the crank 151' in the same direction and the extension 152' of this crank swings the crank 142 in the direction to move the latch 140 to the inclined position, shown in Fig. 13. It is apparent that the cam element 132 will now move inwardly to assume a position in the rear of the main cam face 131. It is thus seen that means are provided to restore the supplemental cam element to the normal position when the shoe contacts with an energized ramp.

When the engine stops, the support 103 moves to the lowermost position and the crank 143 contacts with the trip 152, thereby swinging the same upwardly. This upward movement of the crank 143 (Fig. 11) turns the rock-shaft 141 in the direction to shift the latch 140 (Fig. 13) to the upper inclined position. It is therefore seen that means are also provided to restore the cam element 132 to the inactive position when the train stops.

It will be seen that the words "manually set" refer to changing the relative positions of the supplemental cam and crank 135 to change the low speed limit of the engine.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. The combination with the engineer's brake valve of a locomotive, of automatic control means therefor, comprising an operating member connected thereto, a piston rod connected to said operating member, a pressure cylinder, a piston arranged in said cylinder and connected to said piston rod, said cylinder being provided with an outlet communicating with the atmosphere, an electrically operated valve normally closing said outlet, a pipe connected to said outlet, a casing communicating therewith, a valve arranged in said casing, means for operating said electrically controlled valve, speed responsive means to operate said second valve, and means operable by said first mentioned means to vary the speed at which said speed responsive means will actuate said valve.

2. The combination with the engineer's brake valve of a locomotive, of automatic control means therefor, comprising an operating member connected thereto, a piston rod connected to said operating member, a pressure cylinder, a piston arranged in said cylinder and connected to said piston rod, said cylinder being provided with an outlet communicating with the atmosphere, an electrically operated valve normally closing said outlet, a pipe connected to said outlet, a casing communicating therewith, a valve arranged in said casing, means for operating said electrically controlled valve, speed responsive means to operate said second valve at a selected maximum speed, and means operable by said first mentioned means to cause said speed responsive means to actuate said valve at a speed below the selected maximum speed.

3. The combination with the engineer's brake valve of a locomotive, of automatic control means therefor, comprising an operating member connected thereto, a piston rod connected to said operating member, a pressure cylinder, a piston arranged in said cylinder and connected to said piston rod, said cylinder being provided with an outlet communicating with the atmosphere, an electrically operated valve normally closing said outlet, a pipe connected to said outlet, a casing communicating therewith, a valve arranged in said casing, means for operating said electrically controlled valve, speed responsive means connected to a movable part of the engine, a cam element connected thereto, said cam element being adapted to be elevated as the speed of the locomotive increases, an actuating lever for said second valve, said lever being adapted to be engaged by said cam element when a selected maximum speed in reached to operate said valve, and means operable by said first mentioned means to cause engagement of said cam element and said lever at a speed below the selected maximum speed.

4. The combination with the engineer's brake valve of a locomotive, of automatic control means therefor, comprising an operating member connected thereto, a piston rod connected to said operating member, a pressure cylinder, a piston arranged in said cylinder and connected to said piston rod, said cylinder being provided with an outlet communicating with the atmosphere, an electrically operated valve normally closing said outlet, a pipe connected to said outlet, a casing communicating therewith, a valve arranged in said casing, means for operating said electrically controlled valve, speed responsive means connected to a movable part of the engine, a cam element connected thereto, said cam element being adapted to be elevated as the speed of the locomotive increases, an actuating lever for said second valve, said lever being adapted to be engaged by said cam element when a selected maximum speed is reached to operate said valve, a supplemental cam element carried by said cam element, and means operable by said first mentioned means to move said supplemental cam element into active position to engage said valve actuating lever.

5. In apparatus of the character described, pressure operated vehicle stopping means, means to exhaust pressure from the pressure operated vehicle stopping means to actuate the same, a conduit connected with the pressure operated vehicle stopping means, a normally closed valve connected with the conduit, a movable member having a main cam face, a supplemental cam element connected with the movable member and adapted to be shifted to an active position in advance of the main cam face, a member adapted to open the valve and having a portion thereof arranged in the path of travel of the main cam face and cam element, means to shift the cam element to the active position upon the operation of the pressure operated vehicle stopping means, means to lock the cam element in the active position, and means to restore the cam element to the normal position.

6. In apparatus of the character described, pressure operated vehicle stopping means, means to exhaust pressure from the pressure operated stopping means to actuate the same, a conduit connected with the pressure operated vehicle stopping means, a normally closed valve connected with the conduit, a movable member arranged to open the valve, a movable support having a main cam face to actuate the movable member, a supplemental cam element connected with the movable support and adapted to be shifted to an active position to contact with the movable member, centrifugal means to shift the movable support in one direction, and means to shift the supplemental cam element to the active position upon the operation of the pressure operated vehicle stopping means.

7. In apparatus of the character described, pressure operated vehicle stopping means, means to exhaust pressure from the pressure operated vehicle stopping means, a substantially vertically movable support, centrifugal means connected with the support to shift the same in one direction, a member carried by the support and having a main cam face, a supplemental cam element pivoted to the support and adapted to be shifted to an active position in advance of the main cam face, a cylinder connected with the movable support to be shifted thereby, a piston mounted to reciprocate within the cylinder, a spring to move the piston in one direction, means connected with the piston and adapted upon the movement thereof in one direction to shift the cam element to the active position, a conduit connected with the pressure operated vehicle stopping means, a normally closed valve connected in the conduit, a movable member to open the valve and adapted to be shifted by the main cam face and supplemental cam element, and a conduit having means of communication with the pressure operated vehicle stopping means and connected with the cylinder upon one side of the piston.

8. In apparatus of the character described, pressure operated vehicle stopping means, means to exhaust pressure from the pressure operated stopping means, a movable support, centrifugal means connected with the support to shift the same in one direction, a cam face carried by the support, a supplemental cam element pivoted to the support and adapted to be shifted to an active position in advance of the main cam face, a cylinder connected with the movable support to travel therewith, a piston mounted to reciprocate within the cylinder, a spring to move the piston in one direction, means connected with the piston and adapted upon the movement thereof in one direction to shift the cam element to the active position, electrically operated means to render the last named means operative and inoperative with respect to fulfilling its function, a conduit connected with the pressure operated vehicle stopping means, a normally closed valve connected in the conduit, a movable member to open the valve and adapted to be shifted by the main cam face and supplemental cam element, means to lock the supplemental cam element in the active position, means to restore the supplemental cam element to the normal position, and a conduit having means of communication with the pressure operated vehicle stopping means and connected with the cylinder upon one side of the piston.

9. In apparatus of the character described, pressure operated vehicle stopping means, means to exhaust pressure from the same, a movable support having a main cam face, a supplemental cam element connected with the movable support and adapted to be shifted to an active position in advance of the main cam face, a fluid pressure motor connected with the movable support and having means of communication with the pressure operated vehicle stopping means, means connected with the fluid pressure motor and adapted upon the exhaust of pressure therefrom to shift the supplemental cam element to the active position, a conduit connected with the pressure operated vehicle stopping means, a valve connected with the conduit, and a movable member to open the valve and arranged to be actuated by the main cam face and supplemental cam element.

10. In a train control system of the charter described, a track, ramps arranged near the track at suitable intervals, a source of current, means to connect and disconnect the ramp with and from the source of current, a vehicle to travel upon the track, vehicle stopping means carried by the vehicle, a fluid pressure motor carried by the vehicle and connected with the vehicle stopping means, a conduit connected with the fluid pressure motor, mechanical means to exhaust pressure from the conduit and actuated by the ramps, electrical means for controlling the passage of pressure through the conduit and connected with the mechanical means, a movable support carried by the vehicle, centrifugal means connected with the support to shift the same in one direction and driven by a rotatable part of the vehicle, a cam face carried by the support, a supplemental cam element connected with the movable support and adapted to be shifted to an active position in advance of the main cam face, a fluid pressure motor connected with the movable support and having means of communication with the first named fluid pressure motor, means connected with the fluid pressure motor and adapted upon the exhaust of pressure therefrom to shift the supplemental cam element to the active position, electrical means to render the last named means operative and inoperative with respect to fulfilling its function, a conduit connected with the first named fluid pressure motor, a valve connected with the conduit, and a movable member to open the valve and arranged to be actuated by the main cam face and the supplemental cam element.

11. In a train control system of the character described, a track, ramps arranged near the track in suitable spaced relation, a circuit connected with each ramp including a source of current, means to open and close the circuit, a vehicle to travel upon the track, vehicle stopping means carried by the vehicle, a fluid pressure motor carried by the vehicle and connected with the vehicle stopping means, mechanical means to exhaust pressure from the fluid pressure motor and adapted to be actuated by the ramps, electrical means for controlling the exhaust of pressure from the fluid pressure motor and connected with the mechanical means, a movable support carried by the vehicle, centrifugal means to shift the support in one direction and driven by a rotatable part of the vehicle, a cam face carried by the support, a supplemental cam element connected with the movable support, a second fluid pressure motor connected with the movable support and having means of communication with the first named fluid pressure motor, means connected with the second named fluid pressure motor and adapted to shift the supplemental cam element to the active position, electrical means to render the last named means operative and inoperative with respect to fulfilling its function and connected in series with the first named electrical means, and means adapted to be actuated by the main cam face and the supplemental cam element to exhaust pressure from the first named fluid pressure motor.

12. In apparatus of the character described, the combination with vehicle stopping means, of a movable support, a fluid pressure motor connected with the movable support to travel therewith, a main cam face carried by the movable support, a supplemetal cam element connected with the movable support and adapted to be shifted to an active position in advance of the main cam face, means connected with the fluid pressure motor to shift the supplemental cam element to the active position, electrical means to render the last named means operative and inoperative with respect to fulfilling its function, a latch adapted to hold the supplemental cam element in the active position, and means adapted to be actuated by the main cam face and supplemental cam element to set the train stopping means into action.

13. In apparatus of the character described, the combination with vehicle stopping means, of a movable support, a fluid pressure motor connected with the movable support to travel therewith, a main cam face carried by the movable support, a supplemental cam element connected with the movable support and adapted to be shifted to an active position, means connected with the fluid pressure motor to shift the supplemental cam element to the active position, electrical means adapted when energized to render the last named means inoperative with respect to fulfilling its function, a latch adapted when in the active position to hold the supplemental cam element in the active position, means operated by the electrical means when the same is energized to shift the latch to the inactive position, and means adapted to be actuated by the main cam and supplemental cam element to set the train stopping means into action.

14. In apparatus of the character described, a substantially vertically movable support, a fluid pressure motor carried thereby for movement therewith, a cam element connected with the support and adapted to be shifted to an active position, means connected with the fluid pressure motor to shift the cam element to the active position, electrical means to render the last named means operative and inoperative with respect to fulfilling its function, a latch to hold the cam element in the active position, means operated by the electrical means to shift the latch to the inactive position, means operated upon the movement of the support to the lowermost position to shift the latch to the inactive position, and train stopping means adapted to be actuated by the cam element.

15. In apparatus of the character described, as a subcombination, a substantially vertically movable support, centrifugal means to shift the support, a fluid pressure motor connected with the support to travel therewith, a movable actuating element connected with the support and adapted to be shifted to an active position, means connected with the fluid pressure motor and adapted to shift the actuating element to the active position, and means to supply and exhaust fluid pressure to and from the fluid pressure motor.

In testimony whereof I affix my signature.

WILLIAM B. MURRAY.